United States Patent [19]

Galbraith

[11] Patent Number: 4,600,123
[45] Date of Patent: Jul. 15, 1986

[54] PROPELLANT AUGMENTED PRESSURIZED GAS DISPENSING DEVICE

[75] Inventor: Lyle D. Galbraith, Redmond, Wash.

[73] Assignee: Rocket Research Company, a division of Rockor, Inc., Redmond, Wash.

[21] Appl. No.: 450,354

[22] Filed: Dec. 16, 1982

[51] Int. Cl.$^4$ ............................................. F16K 17/40
[52] U.S. Cl. ...................................... 222/3; 102/530; 137/68.2; 220/89 A
[58] Field of Search ............... 222/3, 396, 5; 102/530, 102/531; 137/68 A, 68 R; 280/737, 736; 220/89 A; 169/28

[56] References Cited

U.S. PATENT DOCUMENTS

| | | |
|---|---|---|
| 3,269,310 | 8/1966 | Wismar . |
| 3,642,304 | 2/1972 | Johnson et al. ........................ 280/737 |
| 3,749,419 | 7/1973 | Usui et al. ............................. 280/737 |
| 3,806,153 | 4/1974 | Johnson ................................. 280/737 |
| 3,895,821 | 7/1975 | Schotthoefer et al. ............... 280/737 |
| 3,897,962 | 8/1975 | Sack . |

FOREIGN PATENT DOCUMENTS 1205297 8/1959 France .
1351051 4/1974 United Kingdom .

Primary Examiner—Joseph J. Rolla
Assistant Examiner—Frederick R. Handren
Attorney, Agent, or Firm—Christensen, O'Connor, Johnson & Kindness

[57] ABSTRACT

A propellant augmented, gas dispensing device is charged with a pressurized gas during assembly by inserting the gas in its solid form into the pressure chamber and thereafter sealing the pressure chamber. The gas is chosen so that it is in its gaseous state at normal ambient conditions. In another aspect, an improved pressure relief assembly includes a burst disc affixed to a flow passage between the pressurized gas chamber and the propellant chamber for normally preventing flow through the passage. In its preferred form, the burst disc carries an annular score line. A support member is provided on the propellant side of the burst disc and is placed in supporting contact with the burst disc adjacent the score line. The support member has a central opening communicating with the passageway to the propellant chamber. The score line is located outwardly from the central opening. The support structure allows the disc to rupture in the region of the central opening upon the occurrence of a predetermined high pressure in the gas chamber, while permitting the disc to rupture along the score line when the pressure difference between the propellant chamber and the gas chamber exceeds a predetermined low pressure on the propellant side of the disc.

10 Claims, 8 Drawing Figures

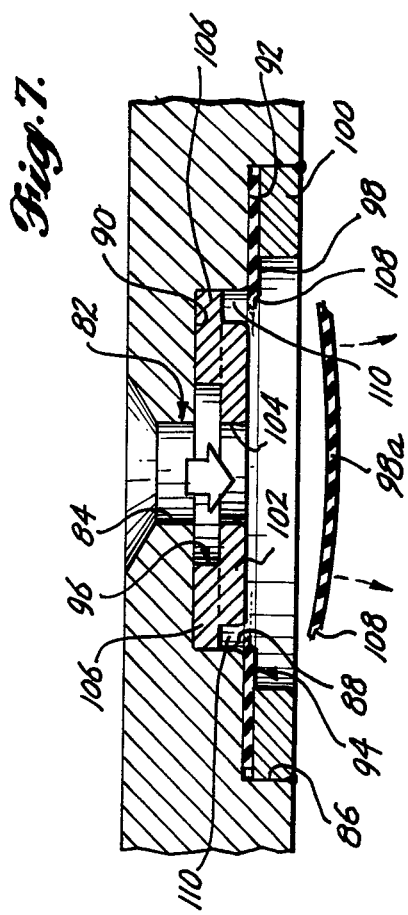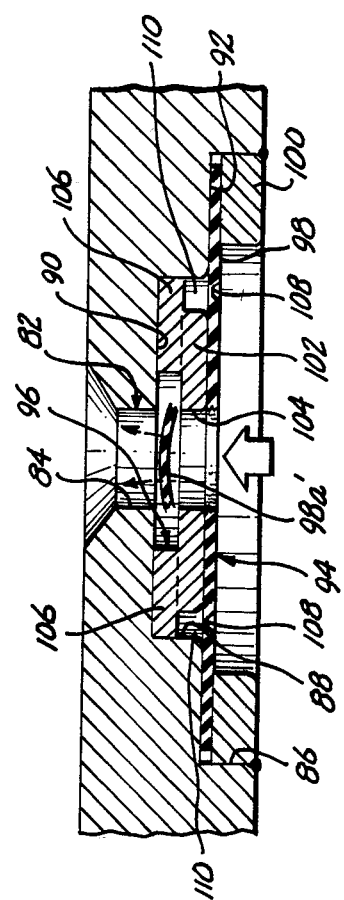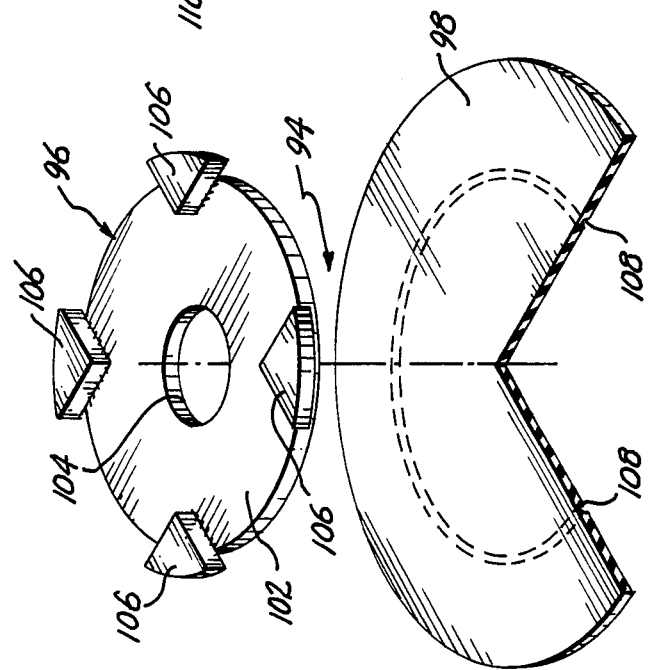

PROPELLANT AUGMENTED PRESSURIZED GAS DISPENSING DEVICE

BACKGROUND OF THE INVENTION

The present invention relates to a propellant augmented gas dispensing device, and more particularly to an improved pressure relief assembly for such a device.

Propellant augmented, gas dispensing devices are utilized for a variety of purposes, including the pressurization of inflatable devices, such as escape slides, life rafts, and air bag safety cushions in automobiles. Typical gas dispensing devices of this type have first and second chambers. The first chamber carries a relatively inert gas under pressure, for example carbon dioxide, while the second chamber carries a solid propellant, for example ammonium nitrate. The solid propellant is utilized as an energy source to heat and pressurize the carbon dioxide gas stored in the first chamber to temperatures on the order of 180° F. and pressures on the order of 5000 psi. Normally, the propellant will pressurize the gas in less than one second, at which time an outlet burst disc in the exhaust passage from the propellant chamber will rupture, allowing the pressurized gas to pass through the propellant chamber and out the exhaust passage. The highly pressurized gas is thus available to do useful work, for example inflate a life raft or other suitable device.

These propellant augmented, dispensing devices are designed for operation over ambient temperatures from, for example, −65° to 160° F. If a device is inadvertently exposed to temperatures in excess of the design temperatures, it is possible for the gas pressures within the device to approach the upper limit of the design pressures of the device. It is desirable for the device to have a safety mechanism that relieves the pressure within the device should it exceed a predetermined maximum. It is, however, necessary for such devices to have a burst disc or similar assembly situated between the propellant and the pressurized gas chamber. The rupture disc prevents the pressurized gas from contacting the propellant prior to ignition so that it can be properly ignited. Once the propellant is ignited, the burst disc will release propellant gases into the gas chamber after the pressure in the propellant chamber has reached a predetermined pressure, normally on the order of 500 psi higher than the stored gas pressure. On the other hand, it is desirable to relieve pressure in the gas chamber once it has reached the desired design maximum, for example on the order of 5000 psi. It is furthermore desirable to simplify the pressure relief assembly to reduce overall weight and cost. If possible, it is also desirable to combine the pressure relief assemblies into a single throw-away mechanism. Previous attempts at solving this problem have met with limited success.

SUMMARY OF THE INVENTION

In its first aspect, the present invention provides an improved pressure relief assembly for a propellant augmented, gas dispensing device. The device includes means defining a pressurized gas chamber, means defining a propellant chamber, means defining a flow passage between the gas and propellant chambers, and means defining an exhaust passage. The improved pressure relief assembly comprises a burst disc affixed in the flow passage for normally preventing flow through the flow passage. The burst disc has a propellant side and a gas side. The improved assembly also includes a support member affixed to the device and located on the propellant side of and in supporting contact with the burst disc. The support member has a central opening communicating with the flow passage. The burst disc is provided with a zone of weakness by a score line for reducing the thickness of the disc. The score line is located outwardly from the central opening. The support member supports the burst disc in the region adjacent the score line. The disc is thus capable of rupturing in the region positioned adjacent the central opening upon occurrence of a first predetermined high pressure in the gas chamber while being capable of rupturing in the opposite direction along the score line when the pressure difference between the propellant chamber and the gas chamber exceeds a predetermined low pressure on the propellant side of the disc. In this manner, a single burst disc can be employed for admitting propellant gas to the gas chamber when the propellant gas reaches a predetermined low pressure. At the same time, the same burst disc is employed for allowing pressure relief in the gas chamber should the device be exposed to temperatures exceeding design temperatures and thus causing the pressure in the gas chamber to prematurely rise beyond a predetermined maximum.

BRIEF DESCRIPTION OF THE DRAWINGS

A better understanding of the present invention can be derived by reading the ensuing specification in conjunction with the accompanying drawings wherein:

FIG. 6 is an exploded isometric view of the two-way burst disc and the support member therefor; and FIGS. 7 and 8 are views similar to that of FIG. 5 showing the two-way burst disc in operation.

DETAILED DESCRIPTION OF THE INVENTION

Figure 1:
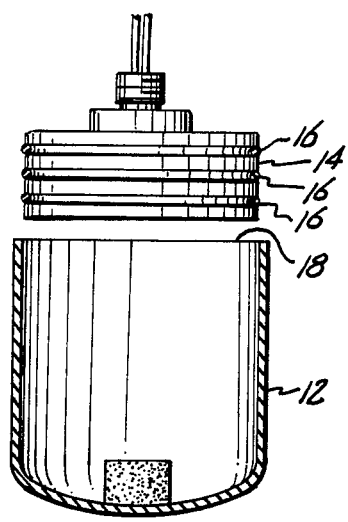
FIG. 1 is an elevation view in partial cross section of a propellant augmented, pressurized gas dispensing device illustrated prior to the insertion of the breech assembly into the pressure vessel.
Figure 2:
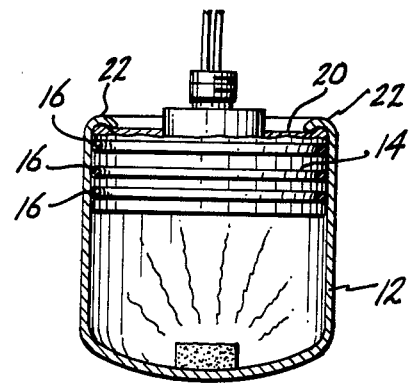
FIG. 2 is a view after the breech assembly and pressure vessel have been assembled and the pressurized gas charged.

Referring first to FIG. 1, a propellant augmented pressurized gas dispensing device includes a pressure vessel 12 and a breech assembly 14. The pressure vessel 12 has relatively thick walls and is designed to safely store pressurized gas under pressures up to and exceeding 8000 psi. As shown in FIG. 1, the pressure vessel 12 and breech assembly 14 are illustrated prior to assembly. The sidewalls of the pressure vessel 12 are cylindrical in shape and its bottom wall is convexly shaped when viewed from the outside of the container. The vessel 12 has a top opening 18 sized to receive the breech assembly 14. The breech assembly is also cylindrical and is sized to be slidably inserted through the top opening 18 in the pressure vessel 12. The outer surface of the breech assembly 14 carries a plurality of O-rings 16 to provide seal between the assembly and the inner surface of the pressure vessel walls. During assembly, the breech assembly 14 is inserted into the opening 18 so that the upper surface 20 of the breech assembly resides below the upper lip 22 of the pressure vessel. The upper lip 22 is then swaged over the peripheral portion of the upper surface 20 of the breech assembly 14 to permanently affix the breech assembly 14 to the pressure vessel 12.

The gas dispensing device, constructed in accordance with the present invention, has no apparatus for charging the pressure vessel 12 with a pressurized gas after assembly. Instead, the gas is placed in the pressure vessel 12 during assembly of the vessel 12 and the breech assembly 14. The gas is placed in the pressure vessel 12 in a solid form, for example as block 20. The breech assembly 14 is thereafter quickly inserted through the opening 18 and the upper lip 22 of the vessel swaged to fasten the assembly 14 to the vessel 12. In a preferred form of the invention, carbon dioxide is employed as the gas. Carbon dioxide in its solid form, commonly referred to as dry ice, can be inserted in the pressure vessel and the breech assembly affixed without substantial loss of carbon dioxide gas. Moreover, the exact amount of carbon dioxide gas with which the pressure vessel 12 is charged can be precisely measured by weighing the exact amount of dry ice to be placed in the pressure vessel. In fact, the rate of sublimation of the dry ice to carbon dioxide vapor at the temperature of assembly can be calculated since the time between the placement of the dry ice in the pressure vessel 12 and the completion of assembly of the gas dispensing device can be measured and controlled. Thus, the amount of carbon dioxide vapor lost during assembly can be calculated and accounted for in the amount of dry ice initially placed in the pressure vessel. Under normal conditions, the dry ice will sublime to its vapor form at normal atmospheric temperatures. Carbon dioxide will always be available as a gas once the propellant charge in the breech assembly 14 is fired to heat and pressurize the gas in the pressure vessel 12. Charging the pressure vessel 12 with the solid form of a gas in accordance with the present invention eliminates the need for an external valve and the necessity for charging the vessel after assembly, while at the same time providing very precise control over the amount of material with which the pressure vessel is charged.

Figure 3:
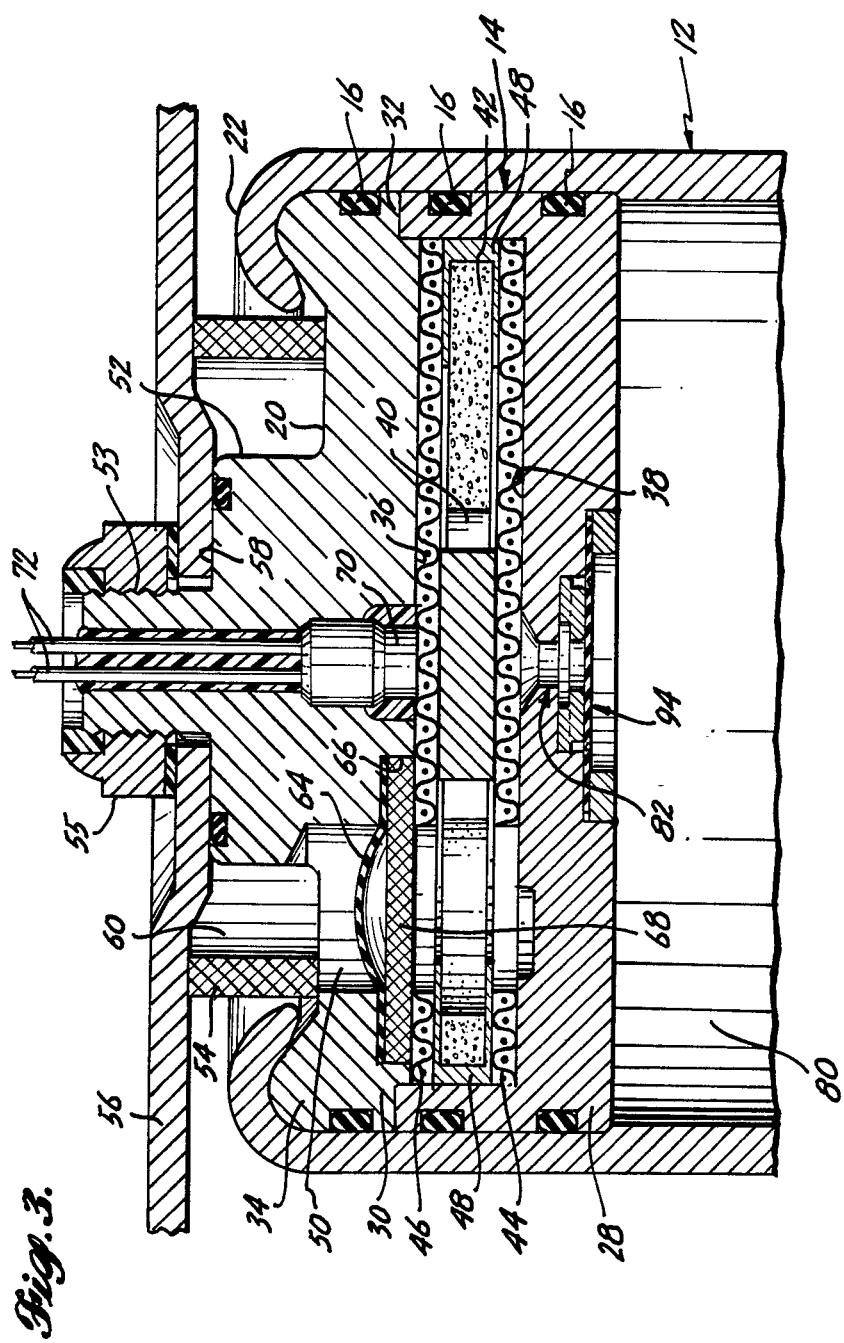
FIG. 3 is an enlarged cross-sectional view of the breech assembly and upper portion of the pressure vessel.

Referring now to FIG. 3, the breech assembly 14 and upper portion of the pressure vessel 12 are shown greatly enlarged. The breech assembly 14 is constructed in two major portions, a lower cup (or bulkhead) 28 and an upper lid (or closure) 30. The cup 28 and lid 30 have similar outside diameters. One of the O-rings 16 is carried by the lid while the others are carried by the cup. The upper lip 32 of the cup 28 fits into an annular groove situated on the bottom peripheral portion of the lid 30. An annular ridge 34 extends upwardly from the peripheral portion of the upper surface 20 of the lid 30. The upper lip 22 of the pressure vessel 12 is swaged over this annular ridge 34. The space between the lower surface 36 of the lid and the bottom surface 38 of the cup-shaped opening in the cup 28 defines a cylindrically shaped propellant chamber 40. An annularly shaped propellant charge 42 is sandwiched between a pair of metal screens 44 and 46 in the propellant chamber 40. U-shaped spacers 48 fit over the outer periphery of the propellant charge 42 and maintain the propellant charge 42 in spaced relationship from the sidewalls of the cup 28 and from the upper and lower surfaces, respectively, of screens 44 and 46.

The propellant chamber 40 communicates with the exterior of the gas dispensing device through an exhaust passage 50 that extends upwardly through the lid 30 at a location radially offset from the center of the chamber 40. A central, cylindrical boss 52 extends upwardly from the upper surface 20 of the lid 30. A reduced diameter threaded member 53 is formed integrally with and extends upwardly from the central portion of the boss 52. An annularly shaped exhaust filter 54 is positioned radially outwardly from the boss 52. A cap 56 has a central opening through which the threaded member 53 extends. The bottom surface of the cap 56 abuts the upper surface 58 of the boss 52 and extends radially outwardly over the exhaust filter 54 contacting the upper edge of the filter 54. The cap 56 is affixed to the boss 52 by nut 55 that is threaded onto the threaded member in abutment with the upper portion of the cap 56. The annular filter 54 thus is retained between the cap 56 and the upper surface 20 of the lid 30. The boss 52, exhaust filter 54 and cap 56 define an annular exhaust chamber 60. The exhaust passage 50 communicates with exhaust chamber 60. Thus, gas departing from the propellant chamber 40 passes through the exhaust passage 50, through the exhaust filter 54, and radially outwardly in all directions between the upper lip 22 of the pressure vessel 12 and bottom surface of the cap 56.

A high pressure burst disc 64 is mounted in a larger diameter portion 66 of the exhaust passage 50 situated adjacent the propellant chamber 40. The high pressure burst disc 64 is designed to rupture outwardly when the propellant has heated the gas to a desired level, for example, on the order of 5000 psi. A small foam disc 68 is positioned in the larger diameter portion 66 of the exhaust passage to insulate the burst disc 64.

A squib or other suitable propellant igniter 70 is mounted in a cavity provided in the central portion of the lid 30. The bottom portion of the squib communicates with the propellant chamber 40. A pair of leads 72 extend upwardly through the boss 52 and through a reduced diameter portion 53 of the boss to a location external of the gas dispensing device. These leads are the ignition leads for the squib 70 which initiates the propellant burn to pressurize the gas in the device.

Figure 5:
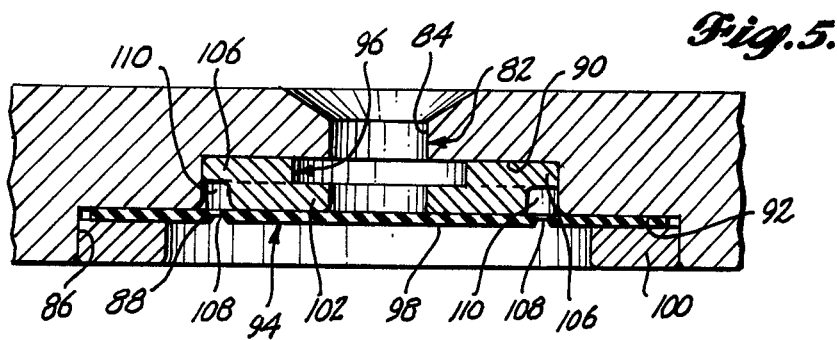
FIG. 5 is a still further enlarged view in partial cross section of a portion of the breech assembly and the two-way burst disc.

Referring additionally to FIG. 5, the propellant chamber 40 communicates with the pressurized gas chamber 80 defined by the pressure vessel 12 via a flow passage 82 axially located in the cup 28 of breech assembly 14. The flow passage 82 comprises a small diameter portion 84, the upper end of which flares outwardly into a fluid communication with the propellant chamber 40. A large diameter portion 86 communicates with the gas chamber 80 while an intermediate diameter portion 88 interconnects the small diameter portion 84 and the large diameter portion. All portions of the flow passage 82 are axially aligned so that a first annular shoulder 90 is formed between the small diameter portion 84 and the intermediate diameter portion 88 and a second annular shoulder 92 is formed between the large diameter portion 86 and the intermediate diameter portion 88. Both of these shoulders face downwardly toward the gas chamber 80.

Figure 4:
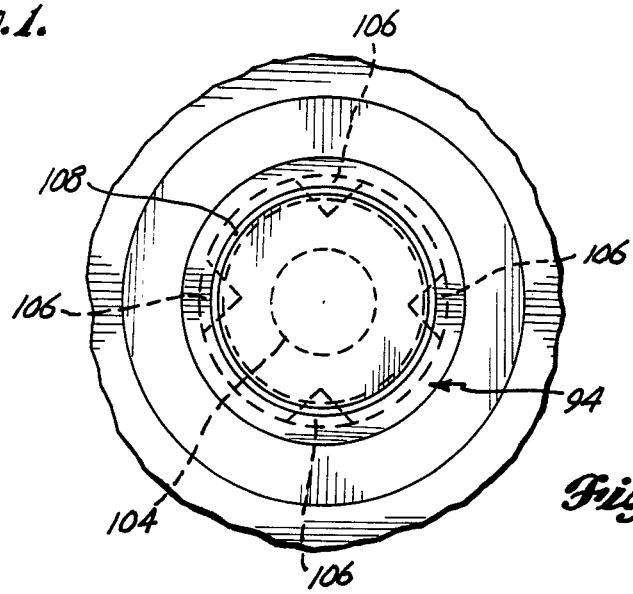
FIG. 4 is a view taken along view line 4—4 of FIG. 3 of the two-way burst disc constructed in accordance with the present invention.

The two-way burst disc assembly 94, constructed in accordance with the present invention, is positioned in the flow passage 82. Referring now to FIGS. 4, 5 and 6, the two-way burst disc assembly 94 includes a support member 96, a burst disc 98 and a retainer ring 100. The support member 96 comprises a ring 102 having a central aperture 104. The central aperture 104 has a diameter substantially equal to that of the small diameter portion 84 of the flow passage 82. The outside diameter of the ring 102 is less than the diameter of the intermediate diameter portion 88 of the flow passage 82. Four feet 106 are affixed to portions of the upper surface of the ring 102 at equally spaced circumferential locations. The feet extend radially outwardly from the periphery of the ring 102 and have arcuate outer surfaces. These surfaces are diametrically spaced at a distance substantially equivalent to the diameter of the intermediate diameter portion 88 of the flow passage 82. The thickness of the feet 106 and ring 102 is equivalent to the depth of the intermediate diameter portion 88, that is, substantially equal to the axial distance between the shoulder 90 and the shoulder 92. The support member 96 is inserted in the intermediate diameter portion 88. The feet 106 serve to axially align the ring 102 with the flow passage 82 and serve to space the ring 102 downwardly from the shoulder 90. The bottom surface of the ring 102 is thus positioned co-planar with shoulder 92. The burst disc 98 is positioned in the large diameter portion 86 of the flow passage 82 so that the lower surface of the ring 102 abuts the upper surface of the burst disc. The burst disc is provided with a circular score line 108 having a diameter slightly larger than the outside diameter of the ring 102 but slightly less than the diameter of the intermediate diameter portion 88 of the flow passage 82, the purpose of which will be better understood when the operation of the two-way burst disc assembly 94 is described in more detail below. The outer edges of the burst disc 98 are situated adjacent the walls of the large diameter portion 86 of the flow passage 82 and thus centering the burst disc within the flow passage 82. The retainer ring 100 has a diameter substantially equal to the large diameter portion 86 of flow passage 82 and an inside diameter greater than the diameter of the intermediate diameter portion 88. The retainer ring 100 is inserted in the large diameter portion 86 and brought into abutment with the peripheral portion of the burst disc 98. The retainer ring 100 can be affixed by conventional means to the cup 28, as, for example, by welding or brazing. The burst disc 98 is thus seated by the retainer ring against the shoulder 92 and agains the bottom surface of the support ring 102.

To understand the operation of the two-way burst disc assembly 94, a normal sequence of operation for the gas dispensing device will first be described followed by a description of how the two-way valve functions to relieve over-pressure in the gas chamber 80. Referring back to FIG. 3, in normal operation, the squib 70 is fired to ignite the propellant charge 42. With some propellants, additional ignition pellets may be necessary. As the propellant burns and produces hot reaction products, the pressure differential between the propellant chamber 40 and the gas chamber 80 reaches predetermined minimum pressure on the propellant side of the two-way burst disc assembly 94, the burst disc 98 will rupture along the score line 108, the weakest zone of the disc, as illustrated in FIG. 7. The hot gaseous reaction products produced by the burning propellant then flows through passage 82 into the gas chamber 80 to heat and compress the carbon dioxide present in that chamber. When the pressure in the gas chamber 80 and the propellant chamber 40 reach a predetermined maximum, that is, a desired inflation pressure, the burst disc 64 in the exhaust passage will rupture, opening the propellant chamber 40 to the exhaust chamber 60 and thus to the apparatus to which the gas is to be dispensed.

A second advantage of the construction of the burst disc assembly shown in FIG. 7 is the provision of the annular flow passage 110 situated between the wall of the intermediate diameter flow passage 88 and the outer periphery of the ring 102 forming part of support member 96. If no annular structure were employed, but just a center hole, the burst disc would still rupture at the score line, however, when the burst disc 98 ruptures and gas begins to flow from the gas chamber 80 through the propellant chamber 40 to the exhaust passage 50, the ruptured portion 98a of the burst disc would tend to reseat over the central aperture, thus sealing the gas chamber and preventing egress of the gas. However, when the burst disc assembly is constructed in accordance with the present invention the annular flow passage 110 permits gas flow past the periphery of the ruptured portion of the disc, even though it seats over the center of the central aperture 104. As a consequence, the gas chamber can still empty through the passage 82 into the propellant chamber and thus into the exhaust passage 50.

The two-way burst disc assembly 94 thus functions in its normal operational mode to open the gas chamber 80 to the propellant chamber 40 once the propellant has been ignited. The two-way burst disc will rupture in the direction of the gas chamber at a relatively low pressure, because the score line weakens the disc. However, should the gas dispensing device be subjected to inordinately high temperatures, for example, which would cause the pressure in the gas chamber to rise, the two-way burst disc also functions as a safety valve to relieve inordinately high pressures in the gas chamber. This pressure relief function is accomplished by constructing the center portion of the disc so that it will rupture through the aperture 104 at relatively high pressures, say for example, on the order of 4000 to 5000 psi. The burst disc 98 will not rupture along the score line in the direction of the propellant chamber because it is supported by the support member 96. However, as shown in FIG. 8, the center portion 98a will rupture and blow through the aperture 104 at relatively high pressures.

The present invention has been described in relation to preferred embodiments thereof. One of ordinary skill after reading the foregoing specification will be able to effect various changes, substitutions of equivalents and other alterations without departing from the broad concepts disclosed herein. It is therefore intended that the scope of protection by Letters Patent hereon be limited only by the definition contained in the appended claims and equivalents thereof.

The embodiments of the invention in which an exclusive property or privilege is claimed are defined as follows:

1. In a propellant augmented gas dispensing device including:
   means defining a gas chamber,
   means defining a propellant chamber,
   means defining a first flow passage between said gas and propellant chambers, and
   means defining an exhaust passage from said propellant chamber,
   an improved pressure relief assembly for said gas chamber comprising:

a burst disc positioned across said first flow passage for preventing flow therethrough, said burst disc having a propellant side and a gas side, and a support member affixed to said device and located on the propellant side of and in supporting contact with said burst disc, said support member having a central opening communicating with said first flow passage, said disc spanning said central opening and having a zone of weakness surrounding and being located radially outwardly from said central opening, said burst disc being substantially supported by said support member in the region adjacent and radially inwardly from said zone of weakness, said disc and said central opening cooperating to allow said disc to rupture in the region adjacent said central opening upon occurrence of a predetermined high pressure in said gas chamber to release the gas in said gas chamber to said exhaust passage, said disc being capable of rupturing along said zone of weakness when the pressure difference between said propollent chamber and said gas chamber exceeds a predetermined low pressure on said propellant side.

2. The device of claim 1 wherein said zone of weakness comprises a score line.

3. The device of claim 2, further including means defining a second flow passage for releasing the gas in said gas chamber to said exhaust passage in the event of blockage in said central opening.

4. In a propellant augmented gas dispensing device including:
means defining a gas chamber,
means defining a propellant chamber,
means defining a first flow passage between said gas and propellant chambers, and
means defining an exhaust passage from said propellant chamber,
an improved pressure relief assembly for said gas chamber comprising:
a burst disc positioned across said first flow passage for preventing flow therethrough, said burst disc having a propellant side and a gas side,
a support member affixed to said device and located on the propellant side of and in supporting contact with said burst disc, said support member having a central opening communicating with said first flow passage, said disc spanning said central opening and having a score line surrounding and being located radially outwardly from said central opening, said burst disc being substantially supported by said support member in the region adjacent said score line, said disc being capable of rupturing in the region positioned adjacent said central opening upon occurrence of a predetermined high pressure in said gas chamber to release the gas in said gas chamber to said exhaust passage, and being capable of rupturing along said score line when the pressure difference between said propellant and said gas chamber exceeds a predetermined low pressure on said propellant side,
means defining a second flow passage for releasing the gas in said gas chamber to said exhaust passage in the event of blockage in said central opening, said second flow passage having an annularly shaped configuration and being located about said central opening.

5. The device of claim 4 wherein said score line is circularly shaped and underlies said annularly shaped second flow passage.

6. In a propellant augmented gas dispensing device including:
means defining a gas chamber,
means defining a propellant chamber,
means defining a flow passage between said gas and propellant chambers, and
means defining an exhaust passage from said propellant chamber,
an improved pressure relief assembly for said gas chamber comprising:
a burst disc positioned across said flow passage for preventing flow therethrough, said burst disc having a propellant side and a gas side, and
a support member affixed to said device and located on the propellant side of and in supporting contact with said burst disc, said support member having a central opening communicating with said flow passage, said disc spanning said central opening and having a zone of weakness surrounding and being located radially outwardly from said central opening, said burst disc being substantially supported by said support member in the region adjacent said zone of weakness, said disc being capable of rupturing in the region adjacent said central opening upon occurrence of a predetermind high pressure in said gas chamber, and being capable of rupturing along said zone of weakness when the pressure difference between said propellant chamber and said gas chamber exceeds a predetermined low pressure on said propellant side, said flow passage having a first portion adjoining said propellant chamber and a second larger diameter portion adjoining said first portion and spaced from said propellant chamber, said means defining said flow passage having a shoulder at the junction of said first and second portions, said disc being positioned between said gas chamber and said shoulder, said support member being positioned between said shoulder and said disc, said central opening being aligned with said first portion.

7. The device of claim 6 wherein said zone of weakness comprises a score line.

8. The device of claim 7 wherein said support member comprises an annular member having an outside diameter less than the diameter of said second portion, said member abutting the propellant side of said burst disc, said support member further comprising a plurality of spacers situated between and in contact with said annular member and said shoulder.

9. The device of claim 8 wherein said spacers are affixed to said annular member.

10. The device of claim 9 wherein said score line is circularly shaped and positioned adjacent the annular space formed between the outer wall of said second portion and said annular member, said score line being on the gas side of said disc.

* * * * *